(12) United States Patent
Barker et al.

(10) Patent No.: US 6,183,718 B1
(45) Date of Patent: Feb. 6, 2001

(54) METHOD OF MAKING STABILIZED ELECTROCHEMICAL CELL ACTIVE MATERIAL OF LITHIUM MANGANESE OXIDE

(75) Inventors: Jeremy Barker; M. Yazid Saidi, both of Redmond, WA (US); Chariclea A. Scordilis-Kelley, Henderson, NV (US)

(73) Assignee: Valence Technology, Inc., Henderson, NV (US)

( * ) Notice: Under 35 U.S.C. 154(b), the term of this patent shall be extended for 0 days.

(21) Appl. No.: 09/307,355

(22) Filed: May 7, 1999

Related U.S. Application Data

(63) Continuation of application No. 08/762,081, filed on Dec. 9, 1996, now Pat. No. 5,869,207, and a continuation of application No. PCT/US97/22525, filed on Nov. 21, 1997.

(51) Int. Cl.[7] .............................. C01G 45/12; H01M 4/50
(52) U.S. Cl. ............................. 423/599; 429/224
(58) Field of Search ............................ 423/599; 429/224, 429/231.1

(56) References Cited

U.S. PATENT DOCUMENTS

| 4,215,188 | 7/1980 | Saathoff et al. . |
| 4,279,972 | 7/1981 | Moses . |
| 4,465,747 | 8/1984 | Evans . |
| 5,168,019 | 12/1992 | Sugeno . |
| 5,192,629 | 3/1993 | Guyomard et al. . |
| 5,399,447 | 3/1995 | Chaloner-Gill et al. . |
| 5,419,985 | 5/1995 | Koksbang . |
| 5,427,875 | 6/1995 | Yamamoto et al. . |
| 5,435,054 | 7/1995 | Tonder et al. . |
| 5,449,577 | * 9/1995 | Dahn et al. ........................ 423/599 |
| 5,463,179 | 10/1995 | Chaloner-Gill et al. . |
| 5,474,858 | 12/1995 | Merritt . |
| 5,482,795 | 1/1996 | Chaloner-Gill . |
| 5,683,835 | 11/1997 | Bruce . |
| 5,693,307 | * 12/1997 | Bowden et al. ................... 423/599 |
| 5,733,685 | * 3/1998 | Wang ................................. 423/599 |
| 5,753,202 | * 5/1998 | Wang et al. ....................... 423/599 |
| 5,783,328 | * 7/1998 | Wang ................................. 429/224 |

FOREIGN PATENT DOCUMENTS

| 59-081870 | 5/1984 | (JP) . |
| 61-165961 | 7/1986 | (JP) . |
| 4-363865 | 12/1992 | (JP) . |
| 6-333598 | 12/1994 | (JP) . |
| 7-235297 | 9/1995 | (JP) . |
| 8-321326 | 12/1996 | (JP) . |
| WO 92 20112 | 11/1992 | (WO) . |

OTHER PUBLICATIONS

G. Herlem, B. Fahys, M. Szekely, E. Sutter, C. Mathieu, M. Herlem, and J.F. Penneau, n–Butylamine as Solvent for Lithium Salt Electrolytes, Structure and Properties of Concentrated Solutions, *Electrochimica Acta*, vol. 41, No. 17, pp 2753–2760, 1996.

* cited by examiner

*Primary Examiner*—Steven Bos
(74) *Attorney, Agent, or Firm*—Linda M. Deschere

(57) ABSTRACT

A method for forming the composition stabilized against capacity degradation comprises particles of spinel lithium manganese oxide (LMO) enriched with lithium by a decomposition product of lithium carbonate forming a part of each said particle and characterized by a reduced surface area and increased capacity expressed in milliamp hours per gram as compared to non-enriched spinel.

17 Claims, 6 Drawing Sheets

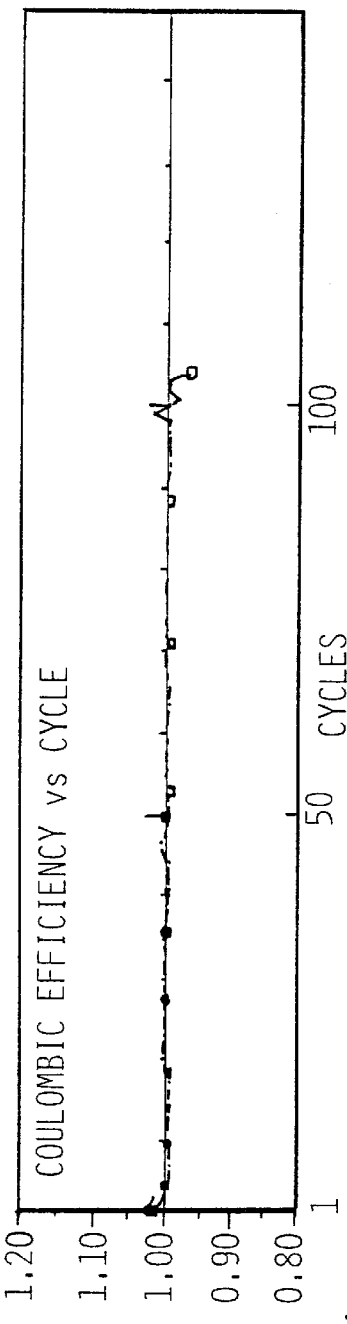
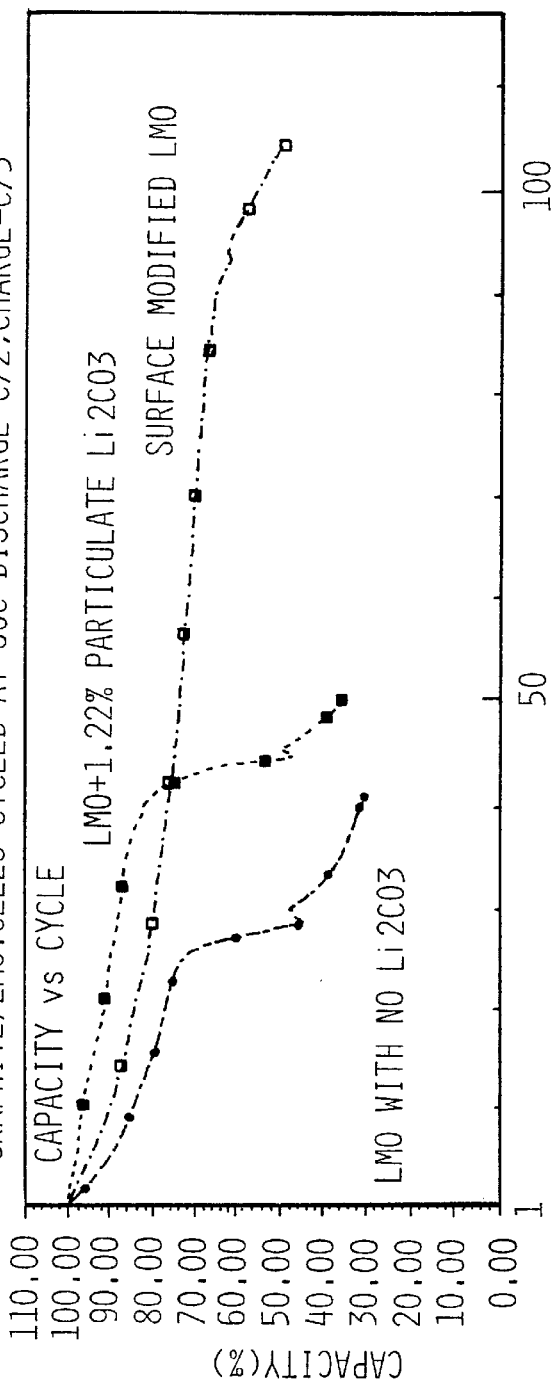
FIG. 7A
FIG. 7B

METHOD OF MAKING STABILIZED ELECTROCHEMICAL CELL ACTIVE MATERIAL OF LITHIUM MANGANESE OXIDE

This application is a continuation of U.S. Ser. No. 08/762,081, filed Dec. 9, 1996, now U.S. Patent No. 5,869,207, and a continuation of PCT/US97/22525, filed Nov. 21, 1997.

FIELD OF THE INVENTION

This invention relates to electrochemical cells and batteries, and more particularly, to such cells and batteries having lithium-based active material.

BACKGROUND OF THE INVENTION

Lithium batteries are prepared from one or more lithium electrochemical cells. Such cells have included an anode (negative electrode), a cathode (positive electrode), and an electrolyte interposed between electrically insulated, spaced apart positive and negative electrodes. The electrolyte typically comprises a salt of lithium dissolved in one or more solvents, typically nonaqueous (aprotic) organic solvents. By convention, during discharge of the cell, the negative electrode of the cell is defined as the anode. During use of the cell, lithium ions (Li+) are transferred to the negative electrode on charging. During discharge, lithium ions (Li+) are transferred from the negative electrode (anode) to the positive electrode (cathode). Upon subsequent charge and discharge, the lithium ions (Li+) are transported between the electrodes. Cells having metallic lithium anode and metal chalcogenide cathode are charged in an initial condition. During discharge, lithium ions from the metallic anode pass through the liquid electrolyte to the electrochemically active material of the cathode whereupon electrical energy is released. During charging, the flow of lithium ions is reversed and they are transferred from the positive electrode active material through the ion conducting electrolyte and then back to the lithium negative electrode.

The lithium metal anode has been replaced with a carbon anode, that is, a carbonaceous material, such as non-graphitic amorphous coke, graphitic carbon, or graphites, which are intercalation compounds. This presents a relatively advantageous and safer approach to rechargeable lithium as it replaces lithium metal with a material capable of reversibly intercalating lithium ions, thereby providing the sole called "rocking chair" battery in which lithium ions "rock" between the intercalation electrodes during the charging/discharging/recharging cycles. Such lithium metal free cells may thus be viewed as comprising two lithium ion intercalating (absorbing) electrode "sponges" separated by a lithium ion conducting electrolyte usually comprising a lithium salt dissolved in nonaqueous solvent or a mixture of such solvents. Numerous such electrolytes, salts, and solvents are known in the art. Such carbon anodes may be prelithiated prior to assembly within the cell having the cathode intercalation material.

In a battery or a cell utilizing a lithium-containing electrode it is important to eliminate as many impurities as possible which may affect cell performance. More particularly, the rechargeability of a lithium metal foil electrode is limited by side reactions between metallic lithium and impurities. When impurities react with lithium there is formed a solid surface layer on the lithium which increases the impedance of the anode (negative electrode). Non-metallic, carbon anodes are also subject to passivation through reaction with cell impurities.

Loss of performance due to impurities has lead to the selection of solvents and salts which are less reactive with cell components. Yet, this avoids use of some solvents and salts which would have better performance in a cell as compared to their less reactive counterparts. In another approach, as exemplified in U.S. Pat. No. 5,419,985, acidic desiccants, and/or hydrolyzable compounds are added to precursor components of the cell. These compounds are used to take up water or hydrolyze with water and then the hydrolysis products are removed before the cell components are assembled. However, since the source of impurities which causes adverse reaction may be from any component within the cell, including negative electrode, positive electrode, and electrolyte, it is very difficult to completely eliminate the impurities prior to assembly of the completed cell. Therefore, such desiccants and hydrolyzable compounds are not sufficiently effective. This is particularly evident since after assembly of the cell, moisture and other impurities from the environment may penetrate through the cell's protective covering. Therefore, what is needed is an understanding of the mechanisms by which impurities cause undesirable loss of performance and reduce cycle life of battery due to undesirable interaction with impurities. Although interaction with metallic lithium has now been resolved by eliminating the use of the metallic lithium, yet there still remains the challenge of determining how impurities cause detrimental loss of capacity and an effective means for preventing loss of cell performance as a result of such interaction.

SUMMARY OF THE INVENTION

In one embodiment, the invention provides a novel composition and method for preventing decomposition of one or more electrochemical cell components comprising an electrode having an active material, and an electrolyte. In co-pending PCT/US97/22525 filed Nov. 21, 1997 (now WO 98/26469) and in then co-pending U.S. Ser. No. 08/762,081 filed Dec. 9, 1996, now U.S. Pat. No. 5,869,207, there is described a method which effectively overcomes problems which arise between the interaction of cell components and contaminate water retained in a cell. Such contaminate water reacts with the electrolyte which comprises a salt of lithium in a solvent. Solubilizing of the salt in solution with attendant interaction between the salt and water causes formation of hydrogen-containing acids. The method of the invention effectively blocks decomposition of a lithium metal oxide cathode active material, and particularly lithium manganese oxide (LMO, nominally $LiMn_2O_4$). Such decomposition is prevented by including in the cell a basic compound which forms an electron donor species in the electrolyte solution; and by neutralizing at least a portion of the acid by reacting the donor species with the hydrogen-containing acids thereby preventing decomposition of the lithium manganese oxide by the acid. The preservation of the lithium manganese oxide prevents degradation of other cell components by other mechanism. In the aforesaid co-pending applications, it was shown that subsequent additional related reactions occur to the same extent as the decomposition of the LMO, suggesting that the LMO break down provides a catalytic effect which causes one or more of the following: generation of water which in turn is capable of being reduced to hydrogen ($H_2$) gas at the anode; generation of additional hydrogen-containing gas (HY, where Y is the anion, for example, HF); and generation of additional decomposition products from components in the cell such as the electrolyte solvent, forming any of a variety of gases such as carbon monoxide, carbon dioxide, and methane, which may further decompose to form $H_2$. The evolution of hydrogen gas by reduction at the anode significantly increases to volumetric size of the battery. In one embodiment described in the aforesaid co-pending applications, the basic compound of the invention forms electron donor species by dissociation in solution when the basic compound is represented by MX where M represents a metal and X represents the electron donor species. In another mechanism, the basic compound additive is an organic compound which provides electron donor species, such as in the case of an $NH_2$ group which is capable of forming an $NH_3$ thereby interfering with formation of the acid component, with the result that acid attack of cell elements is prevented.

The electrochemical cell of the present invention contains LMO stabilized against decomposition. In one embodiment, the cell of the invention comprises the electrolyte, the lithium salt, and a solvent which solubilizes the salt. The cell comprises lithium manganese oxide (LMO) active material and a lithium-containing compound adjacent particles of the LMO active material, and desirably in intimate contact with the LMO active material. More desirably the lithium compound is dispersed on and carried on the LMO particle surface. In another embodiment, the lithium compound is at least partially decomposed in the presence of the LMO particle, causing the lithium content of the LMO to increase. More desirably, the lithium content of the LMO spinel is increased by essentially complete decomposition of the lithium compound. The embodiments described above are combined to optimize performance.

In the aforesaid co-pending applications, the basic compound additives are selected from the group consisting of carbonates; metal oxides; hydroxides; amines; organic bases, particularly those having up to 6 carbon atoms are desirable, such as alkyls and phenols, butylamines; aluminates; and silicates. Most preferred are lithium-based compounds, such as lithium carbonates, lithium metal oxide, lithium mixed metal oxides, lithium hydroxides, lithium aluminates, and lithium silicates. Here the preferred lithium compound is lithium carbonate which decomposes in the presence of LMO at a temperature in a range of 600° C. to 750° C.

In one embodiment, the invention provides a method of treating spinel lithium manganese oxide particles which comprises first forming a mixture of the lithium manganese oxide particles and lithium carbonate. Next, the mixture is heated for a time and at a temperature sufficient to decompose at least a portion of the lithium carbonate in the presence of a lithium manganese oxide. Depending on the temperature selected, a portion of the lithium carbonate is decomposed or reacted with the lithium manganese oxide and a portion of the lithium carbonate is dispersed on the surface of the lithium manganese oxide particles. The result is a treated spinel lithium manganese oxide characterized by reduced surface area and increased lithium content as compared to an untreated spinel lithium manganese oxide. In one alternative, essentially all of the lithium carbonate is decomposed or reacted with the lithium manganese oxide.

In one aspect, the heating is conducted in an air atmosphere or in a flowing air atmosphere. In one embodiment, the heating is conducted in at least two stages beginning at an elevated temperature. Heating is preferably conducted under at least two progressively lower temperatures followed by cooling to an ambient temperature. In one example, progressive stages of heating are conducted, a first stage is in a range of 650 to 700° C., then at a lower temperature on the order of 600° C., then at a lower temperature in a range of 400 to 500° C., followed by permitting the product to cool to an ambient condition. Quenching is considered optional. The heating is conducted for a time up to about 10 hours and the amount of lithium carbonate contained in the mixture is about 0.1% to about 5% by weight of the total mixture.

The product of the aforesaid method is a composition comprising particles of spinel lithium manganese oxide (LMO) enriched with lithium by a decomposition product of lithium carbonate forming a part of each of the LMO particles; and the product is characterized by a reduced surface area and increased capacity expressed in milliamp hours per gram as compared to the initial, non-enriched spinel. In one aspect, the decomposition product is a reaction product of the LMO particles and the lithium carbonate. The lithium-rich spinel so prepared is represented by the formula $Li_{1+x}Mn_{2-x}O_4$ where x is greater than or equal to 0.08 and less than or equal to 0.20, preferably x is greater than 0.081. The character of the product is further defined below. This lithium-rich spinel product is preferably prepared from a starting material of the formula $Li_{1+x}Mn_{2-x}O_4$ where $0 \leq X \leq 0.08$, and preferably the starting material has x greater than 0.05. The lithium-rich spinel product has an Li content greater than that of the LMO starting material.

The product of the aforesaid method will depend upon the extent of heating during heat treatment. If all the lithium carbonate is decomposed or reacted, then the lithium enriched spinel is produced. If some of the lithium carbonate remains unreacted or not decomposed, then it is dispersed on and adhered to the surface of the lithium-rich spinel particles.

In still another embodiment, the heat treated spinel in particle form is mixed with lithium carbonate in particle form, and the particle mixture is used to form an electrode. The electrode comprises the particle mixture, a binder and, optionally, conductive material such as carbon powder.

Objects, features, and advantages of the invention include an improved electrochemical cell or battery based on lithium which has improved charging and discharging characteristics; a large discharge capacity; and which maintains its integrity over a prolonged life cycle as compared to presently used cells. Another object is to provide stabilized electrochemical cells which are stabilized against decomposition of cell components, including electrode and electrolyte components.

These and other objects, features, and advantages will become apparent from the following description of the preferred embodiments, claims, and accompanying drawings.

BRIEF DESCRIPTION OF THE DRAWINGS

FIG. 7 is a two-part graph showing the results of testing comparative cells as per Examples IV and V. Also included is data for a cell having a cathode prepared by the method of Examples II and III, referred to as treated LMO. The cell charge and discharge are as per FIG. 6 except at 60° C. and for up to 100 cycles. In FIGS. 7A and 7B, the data for the cells are labelled as (a) surface modified (treated) LMO of the invention; (b) untreated LMO with $Li_2CO_3$ particulate; and (c) untreated LMO with no additive. FIG. 7A is Coulombic Efficiency and 7B is Discharge Capacity, each Versus Cycles.

DETAILED DESCRIPTION OF THE PREFERRED EMBODIMENTS

Figure 1:
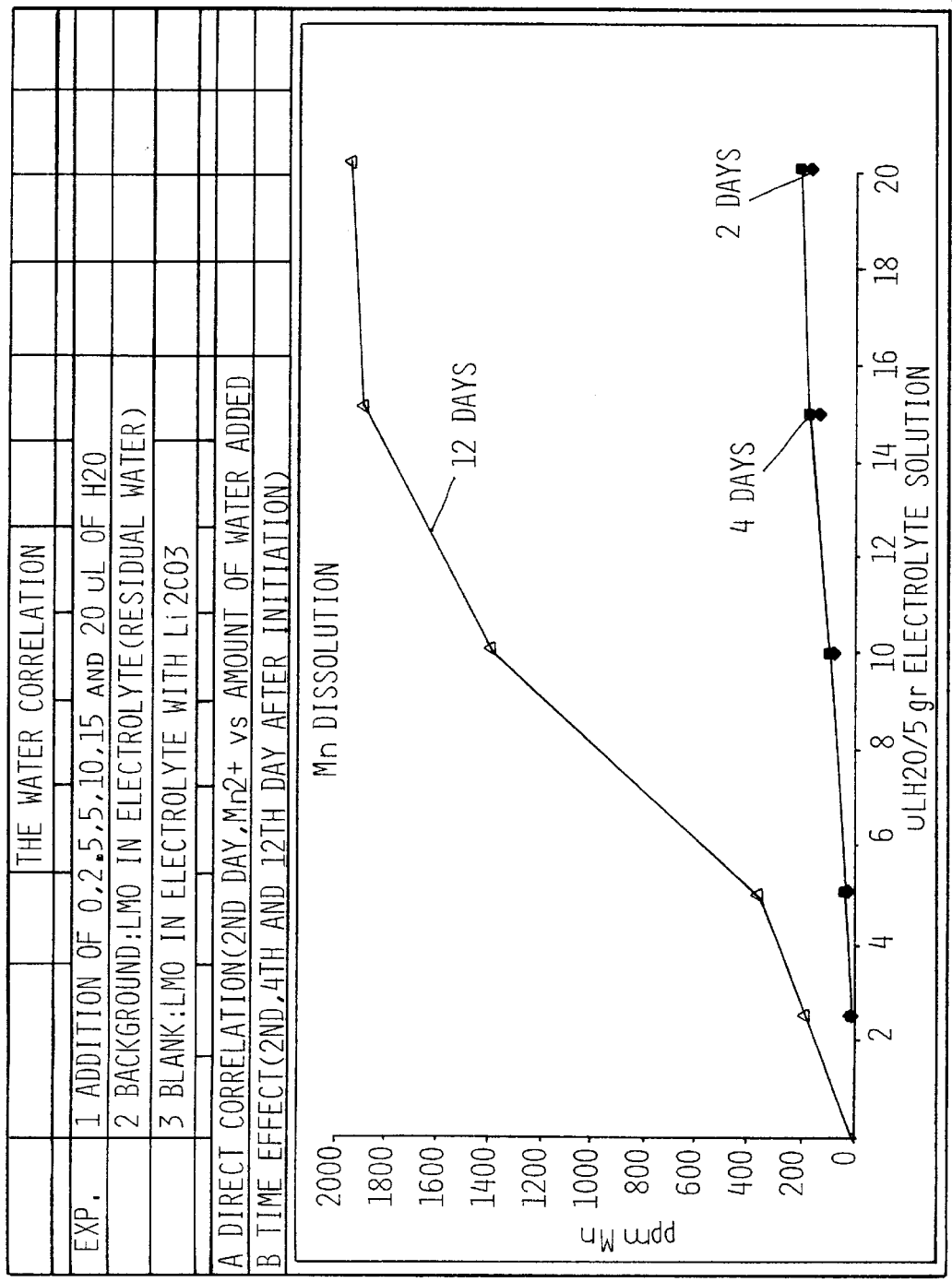
FIG. 1 is a graph showing the results of experiments where a given amount of lithium manganese oxide is added to a given amount of electrolyte. For the various samples, the amount of added water is varied. The various samples were monitored over a prolonged period of time, up to 12 days. The samples show the "time effect" and also the effect of increased amounts of water on the degradation of lithium manganese oxide as evidenced by the appearance of $Mn^{+2}$ ions in the solution.

The mechanisms by which electrochemical cell components are decomposed are described in co-pending PCT/US97/22525, WO 98/26469 which is a continuation of then co-pending U.S. Ser. No. 08/762,081, now U.S. Pat. No. 5,869,207. These applications also describe effective methods for preventing such decomposition as well as compositions for inhibiting decomposition and stabilizing electrochemical cells. In addition, there is provided an overview of the approaches taken in the past and a comparison of such approaches with the more effective means provided in the aforesaid applications, incorporated herein by reference in entirety.

In the past, it was thought that impurities in electrochemical cells resulted in a limited number of undesirable reactions. It was thought that once a significant portion of the impurities were removed, the undesirable reactions would cease to occur. However, the aforesaid applications revealed that even a very small quantity of impurities in the parts per million magnitude cause reactions to occur which are sustained by the cell components themselves. More particularly, this involves decomposition of the active material, and particularly lithium manganese oxide ($Li_xMn_2O_4$, LMO), which is hygroscopic. Obviously, the active material cannot be eliminated from the cell. In contrast to earlier approaches, the present investigation determined that capacity loss occurs for reasons heretofore unexpected. By a series of experiments it was revealed that one mechanism for significant degradation of cathode active material is initiated by the presence of impurities. It was also determined that the degradation rate increases due to generation of water within the cell. By a set of experiments, the investigation was able to document that a very small amount of water in the PPM magnitude reacts with electrolyte salt in the electrolyte solution causing acid generation, and subsequent acid oxidation (acid attack), of the cathode material, and, more particularly, lithium metal oxide cathode material. The acid decomposition of a lithium manganese oxide cathode material produces water. In summary, the electrolyte salt and water produce an acid, the acid attacks the lithium manganese oxide, and the decomposition products include water. Cycling the cell will affect the reaction rates because during cycling, the state of charge or discharge of the battery is an average of 50 percent. The worst case is when the cell is fully charged. Therefore, the problem occurs during storage at essentially, full charge, and also during subsequent cyclic operation.

The electrolyte salt refers to any salt, for example, an inorganic salt which is suitable for use for ion transfer in a lithium cell. See for example U.S. Pat. No. 5,399,447, incorporated herein by reference in its entirety. Examples are $LiClO_4$, LiI, LiSCN, $LiBF_4$, $LiAsF_6$, $LiCF_3SO_3$, $LiPF_6$, NaI, NaSCN, KI, CsSCN, and the like. In a lithium cell, the inorganic ion salt preferably contains a lithium cation and one of the various aforesaid anions. The problem of decomposition is very much evident with $LiPF_6$ since it decomposes readily. $LiAsF_6$ and $LiBf_4$ pose problems similar to $LiPF_6$ and all produce HF. There is relatively little to no problem with $LiClO_4$ and $LiCF_3SO_3$ with regard to interaction with water.

The acid corrosion of the lithium manganese oxide active material is evidenced by the appearance of manganese +2 ions which are soluble in the electrolyte. The $Mn^{+2}$ ions are reduced from the $Mn^{+3}$ or $Mn^{+4}$ state in the original $LiMn_2O_4$ active material. The acid corrosion also causes conversion of spinel lithium manganese oxide active material to open structure spinel $\lambda$-$MnO_2$ (lambda manganese dioxide). The LMO is a spinel belonging to the cubic crystallographic system. The lithium as well as the Mn and oxygen atoms all have assigned sites. On removal of lithium (or when the latter is etched from the LMO), the structure is unchanged because the lithium will vacate their (8a) sites without resulting in an increase in energy of the system (which will make the system unstable). The only change incurred during this process is a contraction of the unit cell, that is, a reduction in volume of the basic unit of the whole structure. Electrostatically, removal of a lithium ion (positively charged), with its electron being delocalized in this case, this will alleviate the Li—Mn bond because they are face sharing sites. However, the primary reason there is no major change in the spinel structure is a simple one. The removal of lithium results in oxidation of $Mn^{3+}$ to $Mn^{4+}$. The latter is a smaller ion. This outweighs the steric effect of the partial occupation of the tetrahedral 8(a) sites by the lithium ions. Obviously, any manganese corrosion means loss of capacity. A series of experiments confirmed the amount of lithium manganese oxide dissolved when in contact with the electrolyte. The conditions included adding controlled amounts of water to the electrolyte solution and then adding a basic compound to the electrolyte solution which essentially buffered the solution and interfered with the acid attack of lithium manganese oxide, the production of additional water, and additional acids as described hereinabove. In the tests, solutions were prepared each containing equal amounts of the lithium manganese oxide. As shown in Table I, experiment A, the beaker contained EC/DMC (ethylene carbonate/dimethyl carbonate) solvent with 1 molar LiPF$_6$ plus 5 microliters of added water. The conditions of case B were the same as A except twice as much added water was used. In case C, the solvent EC/DMC was used without the salt, and the solution was made acidic by the inclusion of 10 microliters of concentrated H$_3$PO$_4$ acid. Conditions of experiment D were the same as C except that concentrated HCl acid was used. In case E, the beaker contained the electrolyte (EC/DMC with 1 molar LiPF$_6$) plus a basic lithium-containing compound (Li$_2$CO$_3$). In experiment F, the beaker contained EC/DMC solvent and water.

As can be seen from Table I, after one day, the electrolyte in the presence of water dissolved and decomposed the lithium manganese oxide by acidic corrosive attack causing formation of 0.23 parts per million of reduced manganese ions dissolved in the solution. In case B, when the amount of water present was doubled, the amount of dissolved manganese doubled. In case C, when the vigorous acid, H$_3$PO$_4$ was included, in place of the added water and electrolyte salt, a significantly larger amount of dissolved manganese was found. The same was true in case D when hydrochloric acid was used. Of surprising interest is case E where the buffer Li$_2$CO$_3$ was included in the beaker, it effectively prevented acid attack of the lithium manganese oxide by the electrolyte. Recall that in case E, no added water was included, yet the LMO contained bound water as an impurity. In case F, the electrolyte salt was not present and the lithium manganese oxide was in the beaker in the presence of water and the solvent alone; essentially no dissolution of manganese was observed. By these experiments, it was possible to determine that loss of the cell capacity is related to dissolution of the cathode active material as evidenced by the presence of the decomposition product (manganese ion) dissolved in solution. It was surprising to find that when equivalent experiments were conducted with a different cathode active material, lithium cobalt oxide, there was very little oxidation of the lithium cobalt oxide. This surprising result demonstrates the susceptibility of lithium manganese oxide cathode active material to acid attack in an electrochemical cell. The results shown in the first column of Table I were based on observations made after the first day. The test beakers were left an additional three days and observations were again made. After four days, the progressively increasing production of acid in test beakers A and B results in 25 to 50 times greater amount of dissolved Mn+2 ions. Interestingly, in case D where the salt (LiPF$_6$) was not included, the presence of the hydrochloric acid, alone, was not sufficient to cause corrosion to further propagate, and there was essentially no additional corrosion. Experiment E clearly shows the beneficial effect of adding a basic compound to prevent acid attack of lithium manganese oxide. Beaker F, like beaker D, shows that the lack of LiPF$_6$ salt means no further corrosion occurs. Importantly, there was essentially no change in the Mn$^{+2}$ ion concentration in beaker E, which contained a buffer to neutralize the acid. The lack of electrolyte salt in beaker F resulted in essentially no decomposition of the LMO, showing that the presence of water, alone, does not account for the decomposition.

Referring to Table II, columns 1 and 2 show the original reagents included in the beaker, in another test. ED is EC/DMC (2:1) while EDL is 2:1 EC/DMC with 1 molar LiPF$_6$. Columns 2 and 3 show the amount of LMO and protons calculated directly from the weight of LMO and acid added. Clearly, there is excess acid, so the manganese dissolution is expected to go to completion given sufficient time (3 weeks). The last column presents the amount of Mn$^{2+}$ measured for each experiment. The last experiment, where HF was produced, had the highest amount of manganese corrosion, and the amount in Column 3, 2.00 mmol H$^+$ was derived assuming 2 mol HF from 1 mol H$_2$O.

The graph in FIG. 1 contains the results of simple experiments where a given amount of LMO is added to a given amount of electrolyte. There are six samples. The first one does not contain any added water, only residual water is present. The five other ones have controlled amounts of water added in them, namely, 2.5, 5, 10, 15, and 20 microliters of water. All samples were made under argon atmosphere, so as not to pick up any additional water from the atmosphere. For each of the samples shown in the plot of FIG. 1, the beaker contained only lithium manganese oxide, Li$_1$Mn$_2$O$_4$, the electrolyte, 2:1 ratio by weight of EC/DMC dissolved therein 1 molar LiPF$_6$. What the graph shows is that there is an increase in the amount of Mn$^{+2}$ found in the solution with time, not a lot to start with, but as time goes by, the amount increases dramatically. Note the increased amounts of Mn$^{+2}$ with increased amounts of water added. The "time effect" has its origin in the difference in reaction rates that seems to be the cause for the change in slope with time. It is thought that both reactions, the LiPF$_6$/H$_2$O interaction, and the Mn dissolution, have different reaction rates, but both occur at the same time. It is not known what causes the "avalanche" effect, but it is believed to be related to the change of the interface layer between the LMO particles and the electrolyte as more surface area is now more accessible to the electrolyte after the initial leaching has occurred, because of the break down of this protective layer.

From the aforesaid experimental evidence, it was determined that a significant, if not major, contributor to loss of cell capacity in lithium manganese oxide-containing cells is corrosive attack on the cathode active material. This is in contrast to the emphasis on decomposition of lithium or carbon battery anodes. Further, based on the aforesaid experiments, the reactions that are thought to be occurring are as shown in Equations 1 and 2.

$$\text{LiPF}_6 + \text{H}_2\text{O} \rightarrow 2\text{HF} + \text{POF}_3 + \text{LiF} \tag{1}$$

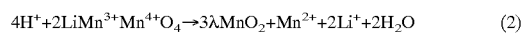

$$4\text{H}^+ + 2\text{LiMn}^{3+}\text{Mn}^{4+}\text{O}_4 \rightarrow 3\lambda\text{MnO}_2 + \text{Mn}^{2+} + 2\text{Li}^+ + 2\text{H}_2\text{O} \tag{2}$$

Equations 1 and 2 show the interaction of water with the acidic electrolyte salt as the main reason for decomposition of cell components. The interaction of, for example, LiPF$_6$ salt with water generates hydrogen fluoride (HF) which is normally in a gaseous state, but is soluble in the organic electrolyte used in the experiments, namely, EC/DMC. It is thought that the POF$_3$ is also soluble in the electrolyte and leads to the generation of fluorophosphoric acid. The reaction of Equation 2 is of significant consequence and is of extreme commercial importance. Since the lithium manganese oxide (here generally represented by the formula $LiMn_2O_4$) is susceptible to corrosion, the acids shown in the above equations etch away at the lithium manganese oxide producing a lithium deficient material, a lambda manganese oxide ($\lambda$-$MnO_2$), and at the same time replenishes the supply of water. The aforesaid reactions are referred to as "avalanche reactions" in that they are able to continue and propagate until essentially all of the lithium manganese oxide is converted to $\lambda$-$MnO_2$. This is evidenced by the manganese ion ($Mn^{2+}$) found solubilized in the electrolyte. This acid attack corrosion of the lithium manganese oxide active material is extremely detrimental to the life of a battery since it obviously results in less capacity. It appears that the state of charge of the battery will have some influence on the reaction. If the battery is stored fully charged, more manganese is corroded or dissolved away from the lithium manganese oxide. The greater the state of charge, the greater is the driving force (rate) of reaction. It should be noted that LMO is represented by the nominal general formula $LiMn_2O_4$, and by the more specific formulas such as $Li_{1+x}Mn_{2-x}O_4$ where $0 \leq x \leq 0.5$ and by $Li_{1+x}Mn_{2-x}O_4$ with $-0.2 \leq x \leq 0.2$, or $0 \leq x \leq 0.2$ in an initial, as prepared, condition. In a fully charged state, the LMO active material is not completely depleted of lithium. In the fully charged state, the nominal $LiMn_2O_4$ is found to roughly correspond to $Li_{0.2}Mn_2O_4$ with approximately 0.8 atomic units of lithium having been transferred to the graphitic anode when fully charged. Therefore, acid attack will deplete $Li^+$ ions along with $Mn^{+2}$ ions.

In summary, Tables I and II and FIG. 1 demonstrate that the two aforementioned reactions (1 and 2) are occurring. Each reaction has a rate which will dictate how fast/slow it will occur. The acidity of the electrolyte (solvent and solubilized salt) is there to begin with, but with the interaction of the water with the acidic electrolyte salt (the exemplary $LiPF_6$), more acid is produced, including the exemplary hydrogen fluoride (HF) and consequently more water. The experiments confirmed that with time, more manganese ion is found in the electrolyte and confirms that the cathode material is being decomposed.

TABLE I

|   |   | PPM $Mn^{+2}$ | |
|---|---|---|---|
|   |   | Day 1 | Day 4 |
| A | Electrolyte + 5 µL $H_2O$ + LMO | 0.23 | 10.3 |
| B | Electrolyte + 10 µL $H_2O$ + LMO | 0.50 | 12.4 |
| C | EC/DMC + 10 µL $H_3PO_4$ + LMO | 12.5 | — |
| D | EC/DMC + 10 µL HCl + LMO | 12.7 | 12.3 |
| E | Electrolyte + $Li_2CO_3$ + LMO | 0.09 | 1.08 |
| F | EC/DMC + $H_2O$ + LMO | 0.04 | 0.02 |

TABLE II

Reaction of $LiMn_2O_4$ with Excess Acid in EC/DMC

| Additive | mmol LMO | mmol $H^+$ | ppm $Mn^{2+}$ |
|---|---|---|---|
| 0.14 gr HCl in ED | 0.27 | 1.37 | 505 |
| 0.13 gr $HNO_3$ in ED | 0.29 | 1.43 | 960 |
| 20 µl $H_2O$ in EDL | 0.28 | 2.00 | 1662 |

Referring back to Equation 1, it can be seen that the exemplary electrolyte salt, $LiPF_6$, solubilizes to form an alkali ion, Li+ion, and a counter ion (anionic species) ($PF_6$—) which comprises a halogen, fluorinated byproduct.

The anionic species may further decompose producing the halogen atom in combination with other constituents, such as HF, $POF_3$, and LiF. Traces of water present anywhere in the cell components will eventually come into contact with these species and constituents, and according to reaction 2, will produce more acid. By using a basic compound added to the cell, it is possible to effectively prevent, minimize or neutralize the acid production (Equation 1) and decomposition of active material (Equation 2). This is exemplified by the basic compounds in reaction Equations 3A and 3B.

$$HF + Li_2CO_3 \rightarrow HLiCO_3 + LiF \quad (3A)$$

$$HF + LiAlO_2 \rightarrow HAlO_2 + LiF \quad (3B)$$

According to Equations 3A and 3B, the additive basic compound (exemplary $Li_2CO_3$ and $LiAlO_2$), when in the presence of the acid (HF), will tie up the fluorine anion (halogen anion) as LiF. LiF is an insoluble salt. At the same time, the carbonate anion ($LiCO_3^{-1}$ and $AlO_2^-$) is a proton acceptor (electron donor) which will combine with the hydrogen from the (HF) acid to form $HLiCO_3$ and $HAlO_2$. More generally speaking, the hydrogen-containing acid is formed by reaction between water, and the electrolyte salt which dissociates to form anionic species which contains a halogen. The basic compound is preferably a metal-containing base represented by MX where X represents an electron donor species which reacts with said hydrogen-containing acid to form HX. The metal (M) of said MX compound reacts with the halogen-containing species to form a metal-halogen compound which is typically relatively insoluble in the electrolyte solvent. With reference again to Equations 1 and 2, the invention comprises minimizing further acid formation by buffering the acidity of the electrolyte so that the acid (HY), or any other acid produced as shown in Equations 1 and 2, is minimized. It is preferred that the basic compound be a basic carbonate, basic metal oxide, basic hydroxide, basic amine, or an organic base. It is desirable that the basic compound is a lithium-containing carbonate, a lithium metal oxide, a lithium mixed metal oxide, lithium hydroxide, or lithium metal oxide. Examples of additives which may be selected are LiOH, $Li_2O$, $LiAlO_2$, $Li_2SiO_3$, $Li_2CO_3$, $CaCO_3$, and organic bases such as organic alkyl bases, alkyl bases having not more than 6 carbon atoms per alkyl group, alkylamine bases, butylamines, desirably n-butylamine, and preferably tributylamine; and primary, secondary, and tertiary organic amines are also a part of the generic group. It is thought that the organic bases interfere with the reactions of Equations 1 and/or 2 by a somewhat different mechanism, yet the result, prevention of decomposition of the LMO is the same. An example based on the butylamines is included in U.S. Ser. No. 08/762,081 and PCT/US97/22525.

There is another consequence of the earlier described decomposition of the metal oxide active material and continuous generation of water. This additional symptom relates to evolution of a considerable quantity of gaseous species concurrent with the manganese dissolution observed affecting the capacity of the cell. The subsequent additional related reactions occur to the same extent as the decomposition of the LMO, suggesting that the LMO break down provides a catalytic effect which causes one or more of the following: generation of water which in turn is capable of being reduced to hydrogen ($H_2$) gas at the anode; generation of additional hydrogen-containing gas (HY, HF) and generation of additional decomposition products from components in the cell such as the electrolyte solvent, forming any of a variety of gases such as carbon monoxide, carbon dioxide, and methane, which may further decompose to form $H_2$. In some solvents, containing C—O—C bonds, it is thought that cleavage occurs at one or both of the bonds in the C—O—C. The evolution of hydrogen gas by reduction at the anode significantly increases the volumetric size of the battery. Decomposition of the lithium manganese oxide provides opportunity for a number of mechanisms catalyzing additional reactions such as decomposition of the electrolyte solvent. The reduction of manganese $Mn^{+3}$ and/or $Mn^{+4}$ to $Mn^{+2}$ involves electron transfer mechanism. Where such electron transfer mechanism is possible, catalysis is also possible. It is thought that the decomposition of the lithium manganese oxide continuously exposes fresh lithium manganese oxide surface to compounds dissolved in the electrolyte solution which provides an effective catalyst for reaction decomposition and cleaving of atomic bonds. Such mechanism is observed for lithium manganese oxide, but, surprisingly, was not observed for other metal oxides such as lithium cobalt oxide. When comparative tests were conducted, it was observed that evolution of gas was very minor and essentially not a problem in the case of lithium cobalt oxide ($LiCoO_2$). In contrast, significant evolution of gas was observed in cells formed of lithium manganese oxide ($LiMn_2O_4$) due to the mechanisms described above. The surface of the lithium cobalt oxide active material from a cell was examined and it was observed that a passivated ionically conductive interface was present. This is thought to create a barrier against electron transfer and prevent interaction between the oxide and other components of the cell. Such stable, barrier passivation, was not observed with lithium manganese oxide cells.

Without being held to any particular theory, it is thought that the lithium manganese oxide dissolution causes the passivation layer to be unstable which allows for further break down of organic electrolyte solvent. Electrolyte decomposition will occur with any solvent at high enough potential. In the case of lithium cells, the solvents are organic, aprotic, polar solvents. The extent of decomposition of solvents will occur at different rates and different potentials. In the case of the exemplary carbonates discussed in the present invention, the solvent may be acyclic carbonate or linear carbonate, yet the same decomposition mechanism applies at different rates. Common organic solvents are γ-butyrolactone, tetrahydrofuran, propylene carbonate, vinylene carbonate, ethylene carbonate, dimethyl carbonate, diethyl carbonate, butylene carbonate, methyl-ethyl carbonate, dipropyl carbonate, dibutyl carbonate, diethoxy ethane, ethyl-methyl carbonate, dimethoxyethane, and dioxolane. An exemplary break down mechanism will now be described for organic solvents which are acyclic or cyclic compounds comprising a low alkyl group having 1 to 4 carbon atoms. Decomposition was observed in the case of the ethylene carbonate/dimethyl carbonate mixture. It appears that such break down occurs in a solvent when the alkyl group is connected through an oxygen to the main chain of the compound. In this case, the alkyl group is cleaved in the presence of the decomposed LMO, which is caused by the acid attack. Therefore, the reaction between the acid and the oxide causes decomposition of the electrolyte solvent. As stated earlier, the extent of decomposition reaction depends on the state of charge of the cell, and the reaction rate is greater at higher state of charge, that is, higher voltage. The rate of gassing is greater at higher state of charge, but the corrosion of the LMO occurs regardless of the state of charge. Yet, for the corrosion reaction, the greater the state of charge, the greater is the driving force for the corrosion reaction.

To further confirm the mechanism of lithium metal oxide break down in the presence of acid leading to break down of other cell components, additional experiments were conducted. Electrochemical cells were assembled and prepared having graphite-based anodes, an electrolyte which is 1 molar $LiPF_6$, and EC/DMC. In one case the cells had a cathode prepared with lithium cobalt oxide ($LiCoO_2$) active material and in the other case, the cell was prepared with lithium manganese oxide active material. Each cell had entrained water in the amount of about 350 parts per million equivalent to about 1.6 milligrams of water. Of this, approximately 20 PPM or 0.024 milligrams of water was included in the electrolyte. The two cells were prepared in the same manner. The content of the exemplary LMO cell will now be described, generic cells are described later, below, with reference to FIG. 2.

EXAMPLE I

The anode was fabricated by solvent casting a slurry of graphite, binder, plasticizer, and solvent. The graphite used for the slurry may be either SFG-15 (Lonza G&T, Ltd; Sins, Switzerland) or BG-35 (Superior Graphite, Chicago, Ill.), Kynar Flex 2801™ (a 88:12 copolymer of polyvinylidene difluoride (PVDF) and hexafloropropylene (HFP) was used as the binder, a plasticizer and an electronic grade solvent were also used. The slurry was cast onto glass and a free standing electrode was formed as the solvent was evaporated. The anode slurry composition was as follows:

| Component | Wet Weight % | Dry Weight % |
|---|---|---|
| Graphite | 24.3 | 58.3 |
| Binder | 6.8 | 16.4 |
| Plasticizer | 10.5 | 25.3 |
| Solvent | 58.4 | — |
| Total | 100.0 | 100.0 |

The cathode was fabricated by solvent casting a slurry of LMO, additive ($Li_2CO_3$), conductive carbon, binder, plasticizer, and solvent. The conductive carbon used was Super P (MMM Carbon), Kynar Flex 2801™ was used as the binder along with a plasticizer, and electronic grade acetone was used as the solvent. The slurry was cast onto aluminum foil coated with a polyacrylic acid/conductive carbon mixture. A cathode slurry was cast onto glass and a free standing electrode was formed as the solvent was evaporated. The cathode slurry composition was as follows:

| Component | Wet Weight % | Dry Weight % |
|---|---|---|
| $Li_2CO_3$ | 0.45 | 1.00 |
| $LiMn_2O_4$ | 28.81 | 64.41 |
| Graphite | 2.44 | 5.45 |
| Binder | 4.43 | 9.90 |
| Plasticizer | 8.61 | 19.24 |
| Solvent | 55.27 | — |
| Total | 100.0 | 100.0 |

The separator used to laminate the anode and cathode together and prevent them from electrically shorting together was formed by solvent casting a slurry of fumed silica oxide, binder, and plasticizer diluted with an appropriate solvent. The fumed silica (Cabo-Sil) acts as a filler to provide structure for the separator film. Kynar 2801 was used as the binder. The plasticizer is used to provide film porosity after extraction. Acetone was used as the solvent. The slurry was cast onto glass using a doctor blade to cast an approximately 2.3 mil thick film after solvent evaporation. The separator slurry composition was as follows:

| Component | Wet Weight % | Dry Weight % |
|---|---|---|
| Fumed $SiO_2$ | 6.0 | 22.3 |
| Binder | 8.9 | 33.3 |
| Plasticizer | 11.8 | 44.4 |
| Solvent | 73.3 | — |
| Total | 100.0 | 100.0 |

An electrochemical cell of the anode, separator, and cathode films was formed by first hot pressing two 48 $cm^2$ pieces of the respective electrode materials to an expanded metal mesh grid. The films were laminated at 120° C. and 50 psi. Copper grid was used for the anode laminate and aluminum grid was used for the cathode. After initial lamination, the electrodes and separator film were laminated together by hot pressing at 115° C. and 40 psi.

After lamination, the plasticizer was extracted to create cell porosity by washing three times in a methanol bath for 20 minutes for each bath. The cells were dried at 40° C. under vacuum overnight after extraction.

The electrolyte used for the cells was a 2:1 ratio of ethylene carbonate to dimethyl carbonate (EC/DMC) with 1 molar $LiPF_6$ as the conductive salt (Grant-Ferro Corp., Zachary La.). The basic compound may also be added to the electrolyte solution. Therefore, the basic compound may be included in any combination of anode, cathode, and electrolyte. A basic compound may also replace a part of the graphite, in a proportion similar to the cathode shown below. It is evident that the electron donor species will react to neutralize acid where ever in the cell such acid is found. Further, the transport properties and ion transfer properties of the solvent, at least to some extent, cause transport of basic compound and/or electron donor species throughout the cell for neutralizing the acid.

The two cells were left in storage for one week. After one week, the cell containing the lithium manganese oxide cathode active material was found to contain 2.5 ppm of $Mn^{+2}$ dissolved in the electrolyte. In contrast, the cell containing the lithium cobalt oxide active material did not contain any dissolved cobalt. This striking difference highlights the surprising susceptibility of $LiMn_2O_4$ to corrosion. It was also observed that essentially no gaseous decomposition products were evolved in the case of the lithium cobalt oxide cell, whereas the flexible storage case containing the lithium manganese oxide-based cell had expanded, puffed out like a balloon, demonstrating the presence of gaseous decomposition products.

Figure 3:
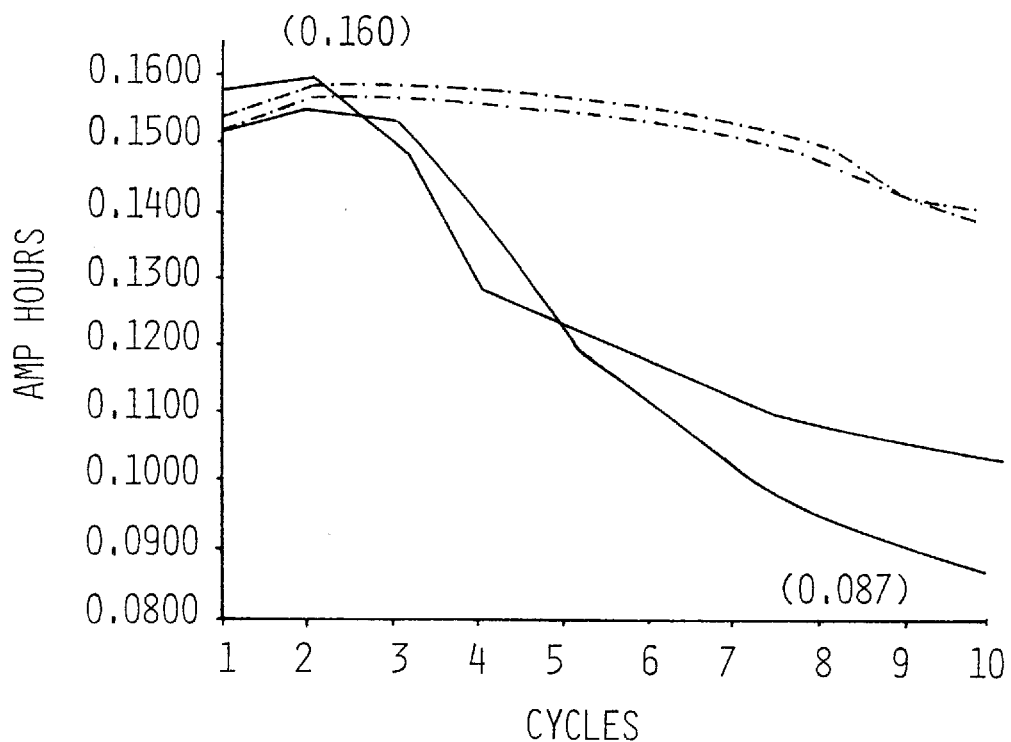
FIG. 3 is a graph of discharge capacity versus cycles at ±2 milliamps per square centimeter between about 3.0–4.2 volts for a cell having LMO cathode, graphite anode, 1 molar $LiPF_6$ in 2:1 by weight EC/DMC solvent. The top two sets of dashed lines are for a cathode mixture which includes basic additive $Li_2CO_3$. The bottom two sets of solid lines are for a conventional cathode mixture without any basic additive.
Figure 4:
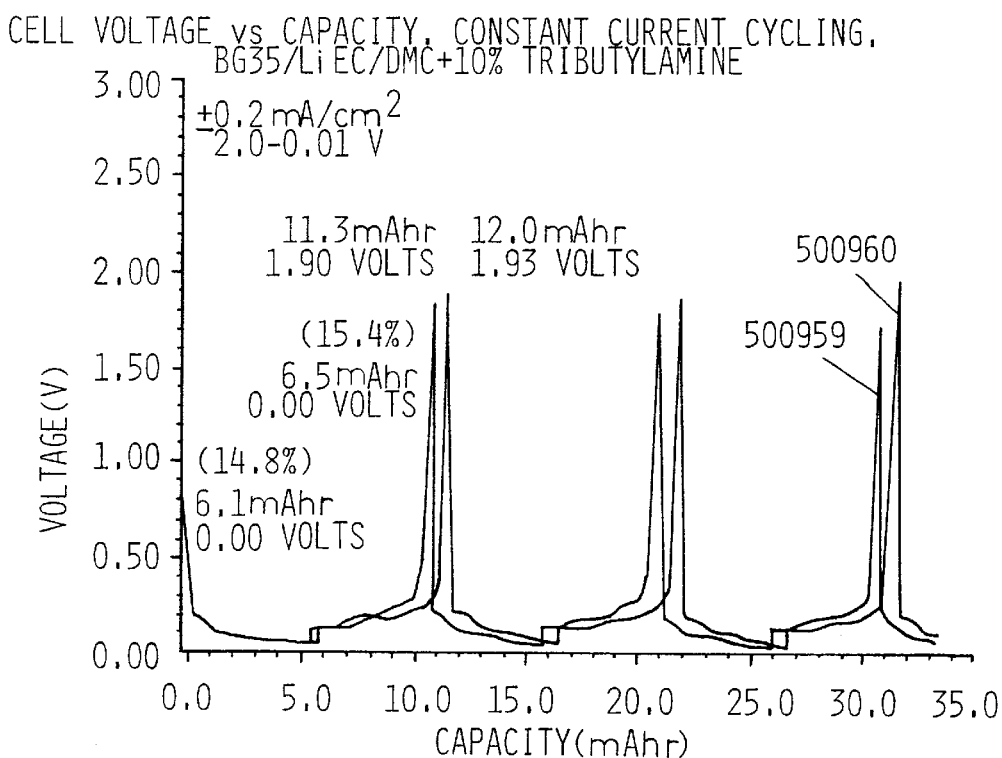
FIG. 4 is a voltage/capacity plot of a graphite electrode cycled with a lithium metal counter electrode using constant current cycling at ±0.2 milliamps per square centimeter, between 2.0 and 0.01 volts. The electrolyte is 1 molar LiPF6 in 2:1 by weight EC/DMC solvent. The graphite is supplied under the name BG by Superior Graphite Corporation (USA). The electrolyte solution contains a basic compound, 10 percent: tributylamine.
Figure 5:
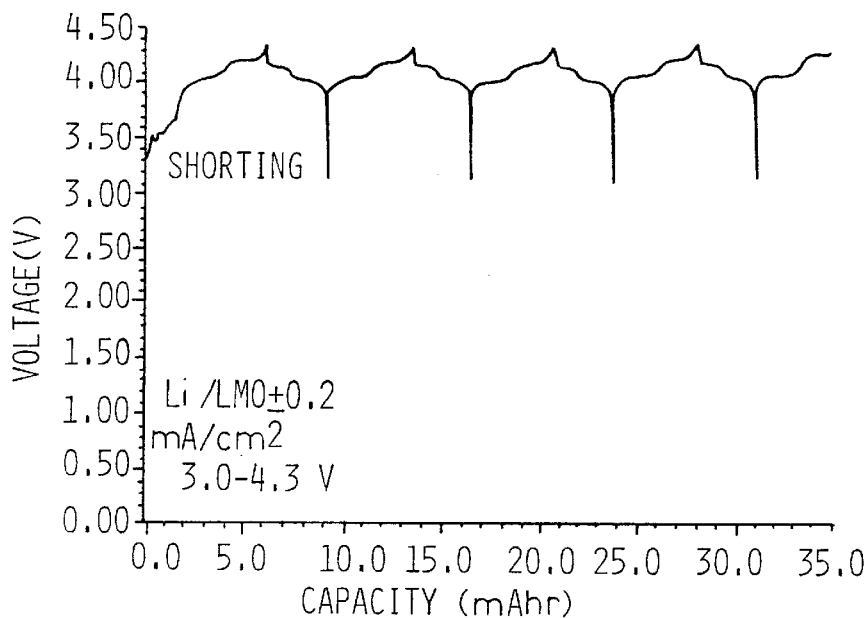
FIG. 5 is a voltage/capacity plot of lithium manganese oxide cycled with a lithium metal anode using constant current cycling at ±0.2 milliamps per square centimeter, between 3 and 4.3 volts. The electrolyte is 1 molar $LiPF_6$ in 2:1 by weight EC/DMC solvent. The basic compound added to the cell is 10 percent tributylamine.

Further proof of the efficacy of the basic compound used to protect lithium manganese oxide active material in an electrochemical cell can be seen by reference to FIGS. 3 through 5. Added cells were prepared as described immediately above, and cycled. The results are shown in FIG. 3. The data sets represented by the dashed lines are cells having the LMO and additive, and maintained high capacity for at least 10 cycles. The capacity loss was only about 15 percent. This performance is remarkable. Comparative cells were prepared as described immediately above, but without the additive. The results are shown in FIG. 3, data sets represented by the lower two solid lines. Capacity diminished from 0.160 to 0.087 amp hours within 10 cycles, a 45 percent decline.

FIG. 4 shows a voltage capacity plot using the 10 percent tributylamine basic compound additive in the cell comprising a graphite electrode and a lithium metal counter-electrode using 1 molar $LiPF_6$ and EC/DMC solvent. In the first half cycle the voltage drops to approximately 0.01 volts. In the second half cycle, the average voltage reaches approximately 2 volts versus $Li/Li^+$, with intercalation. The percentage difference between the capacity "in" and the capacity "out" on the first cycle corresponds to a surprisingly low capacity loss in the range of 14.8 to 15.4 percent. In the rest of FIG. 4, the first and second half cycles are repeated, showing the remarkable consistency and cyclability of this cell. FIG. 5 shows a voltage capacity plot of lithium manganese oxide cycled with a lithium metal electrode where the cell contains the basic compound 10 percent tributylamine in the electrolyte solution comprising $LiPF_6$ and EC/DMC. Constant current cycling is at ±0.2 milliamps per centimeter square, between 3 and 4.3 volts versus $Li/Li^+$. FIG. 5 demonstrates the excellent reversibility of this system. Cyclic performance is adequately maintained with the basic additive forming a part of the electrolyte solution. Therefore, the basic additive is able to function to prevent decomposition of cell components without demonstrating any incompatibility and without demonstrating any adverse effect on cell operation.

In one embodiment, for maximum effectiveness in preventing decomposition of the cathode active material, the basic lithium compound is in direct or indirect ion transfer, ion transport, relationship with the acid in the cathode. This provides electron donor species in contact with or at least closely adjacent particles of the active material. Such species then reacts with acid to prevent acid from attacking the active material. It is preferred that the basic compound additive be dispersed throughout the cathode (positive electrode) of the cell. If the additive is not soluble in the solvent or is not miscible in the electrolyte solvent, it is preferably included in the cathode mixture. If the additive is soluble in the electrolyte or miscible with the electrolyte solvent, it is preferably added to the solvent. In one embodiment, the additive is a basic liquid miscible in the electrolyte solvent and migrates to and throughout the cathode. Even an immiscible basic liquid will be transported to some extent within the cell by the electrolyte solvent. A basic additive which is soluble in the electrolyte solvent migrates to and throughout the cell including the electrodes. In still another embodiment, the basic additive is an insoluble solid or immiscible liquid which forms a part of the electrode mixture, preferably added to the precursor cathode paste. In order to provide maximum protection to the cathode material, it is preferred that the basic compound be in intimate contact with the cathode active material. It is desirable that the basic additive be mixed with particles of the lithium manganese oxide active material in the precursor paste. It is preferred that the lithium manganese oxide material being in particle form is intermingled with a basic compound which is itself also in particle form. By this arrangement, the basic material is in intimate particle-to-particle, grain-to-grain contact, with the lithium manganese oxide active material it is meant to protect. If desired, the basic compound additive may be included in other components of the cell including the electrolyte and the anode (negative electrode).

Preferred additives effectively neutralize the undesirable acidic effects without affecting the electrochemical performance of the cell, because the metal ion of the additive is the same ion, namely, lithium, which is the ionic species which engages in the electrochemical function of a cell. These additives, therefore, effectively and efficiently block the recurring reactions which lead to acid formation, lithium manganese oxide degradation, and consequential gas generation. The method and compositions of the invention can be easily used commercially to form electrochemical cells having improved electrochemical stability and capacity.

Various methods for fabricating electrochemical cells and batteries and for forming electrode components are further described immediately below to illustrate use of the additive. The invention is not, however, limited by any particular fabrication method as the novelty lies in the unique compositions used in the cells to stabilize the cells. Accordingly, additional methods for preparing electrochemical cells and batteries may be selected and are described in the art.

Figure 2:
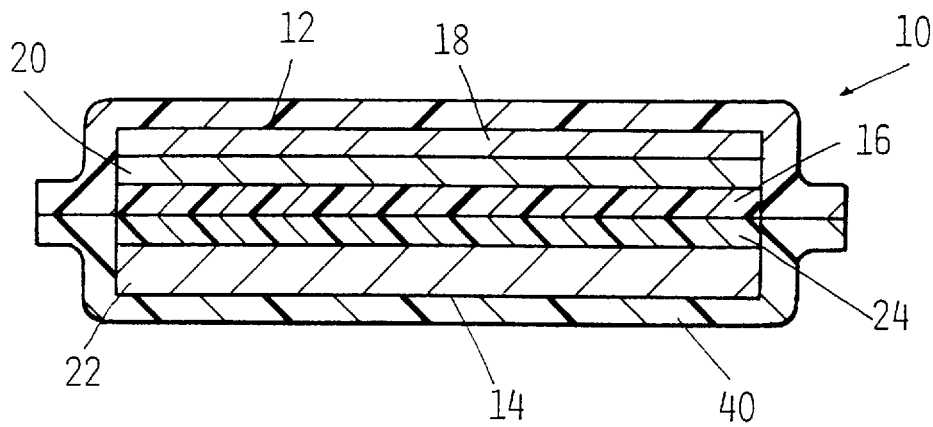
FIG. 2 is an illustration of a cross section of a thin battery or cell embodying the invention.

A typical laminated battery cell structure 10 is depicted in FIG. 2. It comprises a negative electrode side 12, a positive electrode side 14, and an electrolyte/separator 16 therebetween. Negative electrode side 12 includes current collector 18, and positive electrode side 14 includes current collector 22. A copper collector foil 18, preferably in the form of an open mesh grid, upon which is laid a negative electrode membrane 20 comprising an intercalation material such as carbon or graphite or low-voltage lithium insertion compound, dispersed in a polymeric binder matrix. An electrolyte separator film 16 membrane of plasticized copolymer is positioned upon the electrode element and is covered with a positive electrode membrane 24 comprising a composition of a finely divided lithium intercalation compound in a polymeric binder matrix. An aluminum collector foil or grid 22 completes the assembly. Protective bagging material 40 covers the cell and prevents infiltration of air and moisture. In another embodiment, a multicell battery configuration is prepared with the same components in a slightly different arrangement.

The relative weight proportions of the components of the positive electrode are generally: 50–90% by weight active material; 5–30% carbon black as the electric conductive diluent; and 3–20% binder chosen to hold all particulate materials in contact with one another without degrading ionic conductivity. Stated ranges are not critical, and the amount of active material in an electrode may range from 25–85 weight percent. The negative electrode comprises about 50–95 by weight of a preferred graphite, with the balance constituted by the binder. A typical electrolyte separator film comprises approximately two parts polymer for every one part of a preferred fumed silica. Before removal of the plasticizer, the separator film comprises about 20–70% by weight of the composition; the balance constituted by the polymer and fumed silica in the aforesaid relative weight proportion. The conductive solvent comprises the solvent of the invention and suitable salts. Desirable salts and solvent/salt ratios are described in U.S. Pat. No. 5,712,059 and 5,418,091. One example is a mixture in a weight ratio of about 90 parts or more of solvent to 10 parts or less of salt. Therefore, the range of salt content may be very broad.

Separator membrane element 16 is generally polymeric and prepared from a composition comprising a copolymer. A preferred composition is the 75 to 92% vinylidene fluoride with 8 to 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured. The plasticizing solvent may be one of the various organic compounds commonly used as casting solvents, for example, carbonates. Higher-boiling plasticizer compounds such as dibutyl phthalate, dimethyl phthalate, diethyl phthalate, and tris butoxyethyl phosphate are particularly suitable. Inorganic filler adjuncts, such as fumed alumina or silanized fumed silica, may be used to enhance the physical strength and melt viscosity of a separator membrane and, in some compositions, to increase the subsequent level of electrolyte solution absorption.

Examples of forming cells containing metallic lithium anode, intercalation electrodes, solid electrolytes and liquid electrolytes can be found in U.S. Pat. Nos. 4,668,595; 4,830,939; 4,935,317; 4,990,413; 4,792,504; 5,037,712; 5,262,253; 5,300,373; 5,435,054; 5,463,179; 5,399,447; 5,482,795 and 5,411,820; each of which is incorporated herein by reference in its entirety. Note that the older generation of cells contained organic polymeric and inorganic electrolyte matrix materials, with the polymeric being most preferred. The polyethylene oxide of U.S. Pat. No. 5,411,820 is an example. More modern examples are the VDF:HFP polymeric matrix. Examples of casting, lamination and formation of cells using VdF:HFP are as described in U.S. Pat. Nos. 5,418,091; 5,460,904; 5,456,000; and 5,540,741; assigned to Bell Communications Research, each of which is incorporated herein by reference in its entirety.

As described earlier, the electrochemical cell may be prepared in a variety of ways. In one embodiment, the negative electrode may be metallic lithium. In more desirable embodiments, the negative electrode is an intercalation active material, such as, metal oxides and graphite. When a metal oxide active material is used, the components of the electrode are the metal oxide, electrically conductive carbon, and binder, in proportions similar to that described above for the positive electrode. In a preferred embodiment, the negative electrode active material is graphite particles. When forming cells for use as batteries, it is preferred to use an intercalation metal oxide positive electrode and a graphitic carbon negative electrode. Various methods for fabricating electrochemical cells and batteries and for forming electrode components are described herein. The invention is not, however, limited by any particular fabrication method.

Since cathode compositions are prepared in the form of precursor pastes with a casting solvent and coated onto a current collector, it is possible to mix the lithium manganese oxide particles with particles of the basic compound additive and include them together as part of the precursor paste which is coated onto the current collector. The additive added to the paste may be in solid or liquid form. A liquid additive must be less volatile than the casting solvent, so that the liquid additive will remain in the paste after removal of the casting solvent. Therefore, the liquid additive will remain in intimate contact with the lithium manganese oxide active material after the cathode is formed. Alternatively, if a liquid base such as liquid organic base is used, it may be added directly to the electrolyte solution after the cell has been assembled or at any stage of cell assembly. If a liquid additive or soluble additive is used, it would find its way to all components of the cell and migrate throughout all such components. A limited selection of organic bases is miscible in the electrolyte solution and maintains electrochemical stability. The additive in particle form may also be included as a part of the electrolyte. It is thought that a solid insoluble additive is most effective when it is included directly as part of the cathode composition. It is thought that the additive in particle form would be least effective when included with the electrolyte or merely in surface contact with the cathode as it will not be in intimate contact with the bulk of the cathode lithium manganese oxide. The particle basic compound may also be added in the anode to counteract formation of acid by any water present in the anode, however, this is most remote from the cathode and will be of less direct influence in protecting the cathode active material from degradation.

The amount of the basic compound additive should be sufficient to buffer the electrolyte solution. As mentioned earlier, the electrolyte solution is typically 1 molar $LiPF_6$, or an equivalent salt, in an organic solvent such as EC/DMC. This solution by itself will be somewhat acidic. The invention seeks to prevent additional acid formation and prevent increased acidity by reaction of the salt with water. Therefore, the amount of additive should be sufficient to buffer the solution and cause its acidity to be maintained near the level of the electrolyte solution itself and prevent increased acid concentration due to decomposition of the electrolyte salt and reaction with water. In that regard, the amount of additive should be in an amount by weight which is less than the amount by weight of said active material in the cathode. An amount of additive equal to about 1 percent by weight of the LMO should be sufficient, and is thought to be 3 times greater than that required for a cell containing an estimated 350 ppm retained water. The amount of additive should not be so great that it significantly changes the acidity of the 1 molar $LiPF_6$ EC/DMC solution causing it to be relatively basic. It is preferred that the basic additive be electrochemically stable and not cause any other side reactions or interactions that could effect the operation of the cell. Therefore, a lithium-based compound is preferred. The basic additive should be stable and able to sustain voltage in the range of about 3.5 to 4.5 volts at which a lithium manganese oxide cell operates. It is preferred that the compound be a lithium-containing carbonate, such as lithium metal oxide, lithium hydroxide, so that when it reacts in solution to cause neutralization it does not release heterogeneous ions, that is, ions other than lithium. Therefore, lithium salts are preferred. Mixed oxides and mixed metal oxides, such as $LiAlO_2$ and $Li_2SiO_3$, are desirable. As stated, it is preferred that the additive function as a buffer and not cause the electrolyte solution to become more basic. The acidity of the typical electrolyte described above (LiPF6) is about a pH of 4. Therefore, if the basic compound additive has a pH in the range of 9 to 11, it should be sufficiently basic to act as a buffer. It is preferred that the pH of the basic compound additive not be above 12 or 13.

The examples below show the use of lithium carbonate to enrich the lithium content of the spinel LMO by forming an $LMO/Li_2CO_3$ mixture and then reacting or decomposing the $Li_2CO_3$. The result is particles of LMO enriched with lithium.

EXAMPLE II—Treated LMO

Lithium manganese oxide spinel (LMO) was obtained from Japan Energy Corporation having the specifications as per Table III, and designated Japan Energy Corporation ISR 140B. The method used to make all the treated LMO in the below examples is as per the following steps. The procedure begins with mixing LMO and lithium carbonate by ball milling for 60 minutes. A low level (1–2 weight percent) of high purity lithium carbonate around 5 micron particle size is used. Such lithium carbonate is available from Pacific Lithium, New Zealand. Large ceramic media was used for this operation. This caused no attrition of the material. The media was then removed from the mixture. The mixed $Li_2CO_3$/LMO was heated in a Box Furnace, set at between 600–750° C., for 30 minutes. The treated material was removed from the furnace and immediately transferred to a second Box Furnace set at 450° C. for 1 hour. This furnace had a good supply of flowing air throughout to minimize oxygen deficiency and to overcome the tendency of LMO to lose oxygen at about 700° C. or higher. The treated material was then removed from the second furnace and allowed to cool to room temperature. The color change of the LMO as per Table III is of interest. The treated LMO has a slight red color, and this differs from the untreated LMO which is grey/black. A material of the formula $Li_2MnO_3$ is known to be red in color. The treated product is thought to include cations of lithium bound to the spinel particles at least at the external surface.

EXAMPLE III—Cell With Treated LMO

A graphite electrode was fabricated by solvent casting a slurry of MCMB2528 graphite, binder, plasticizer, and casting solvent. MCMB2528 is a mesocarbon microbead material supplied by Alumina Trading, which is the U.S. distributor for the supplier, Osaka Gas Company of Japan. This material has a density of about 2.24 grams per cubic centimeter; a particle size maximum for at least 95% by weight of the particles of 37 microns; median size of about 22.5 microns and an interlayer distance of about 0.336. The binder was a copolymer of polyvinylidene difluoride (PVDF) and hexafluoropropylene (HFP) in a wt. ratio of PVDF to HFP of 88:12. This binder is sold under the designation of Kynar Flex 2801™, showing it's a registered trademark. Kynar Flex is available from Atochem Corporation. An electronic grade solvent was used. The slurry was cast onto glass and a free standing electrode was formed as the casting solvent evaporated. The electrode composition was approximately as follows on a dry weight % basis: 70 graphite; 9.5 binder; 17.5 plasticizer and 3.0 conductive carbon.

An electrode cathode was also fabricated by solvent casting a slurry of heat treated lithium manganese oxide (LMO) as per Example II, conductive carbon, binder, plasticizer, and solvent. The conductive carbon used was Super P (MMM carbon), Kynar Flex 2801™ was used as the binder along with a plasticizer, and electronic grade acetone was used as the solvent. The slurry was cast onto aluminum foil coated with polyacrylic acid/conductive carbon mixture. The slurry was cast onto glass and a free standing electrode was formed as the solvent was evaporated. The cathode electrode composition was approximately as follows on a dry weight % basis: 72.9 treated LMO; 3.0 carbon, 8.1 binder; and 16.0 plasticizer. In a preferred method, prior to cell construction the plasticizer is extracted.

A rocking chair battery was prepared comprising the anode, the cathode, and an electrolyte. The ratio of the active anode mass to the active cathode mass was 1:3.23. The two electrode layers were arranged with an electrolyte layer in between, and the layers were laminated together using heat and pressure as per the Bell Comm. Res. patents incorporated herein by reference earlier. In a preferred method, the cell is activated with EC/DMC solvent solution containing 1 M $LiPF_6$ salt.

EXAMPLE IV—LMO Cell

Another cell was prepared with an anode prepared in accordance with the method of Example III. In this case as received, untreated LMO was used to form the cathode as per Table III "Before" column. The cathode was otherwise prepared as per Example III.

EXAMPLE V—LMO and Particulate Carbonate

An additional cell was prepared with an anode prepared in accordance with the method of Example III. In this case the LMO for the cathode was as-received, untreated LMO per Table III "Before" column. The cathode also included particulate lithium carbonate as per Example I.

TABLE III

|  | BEFORE | TREATED LMO[1] |
|---|---|---|
| Surface Area/m$^2$/g | 0.8505 | 0.6713 |
| d10 | 10.74 | 8.59 |
| d50 volume % | 31.12 | 28.13 |
| d97 | 69.84 | 63.68 |
| Li content/wt % | 4.05 | 4.26 |
| Lattice Constant a (Å) | 8.2158 | 8.2105 |
| x in Li$_{1+x}$Mn$_{2-x}$O$_4$ (From XRD)* | 0.086 | 0.112 |
| Residual Li$_2$CO$_3$ | 0 | 0.26% |
| Oxygen Deficiency | 0 | 0.03% |
| Color | Grey/Black | Slight Red Color |

*XRD = x-ray diffraction
[1]Treated LMO: Heated at 750° C. 98.33% LMO + 1.67% Li$_2$CO$_3$ (By Weight)

TABLE IV

Corrosion Rate Tests*

| Sample | Li$_2$CO$_3$/LMO[1] | Preparative Method[2] | 60° C. ppm Mn$^{2+}$ in electrolyte[3] |
|---|---|---|---|
| LMO | 0/100% | none | 21.8 |
| LQ1 | 1%/99% | mixture heated at 750° C. | 6.2 |
| KQ1 | 5%/95% | mixture heated at 750° C. | 2.8 |

*Stored at 60° C. for 7 days in electrolyte (1M LiPF$_6$ EC/DMC 2:1 by weight)
[1]Composition of Ball milled Li$_2$CO$_3$/LMO prior to surface treatment.
[2]Surface treatment Preparative Method.
[3]ppm Mn$^{2+}$ found in electrolyte following storage.

Figure 6A:
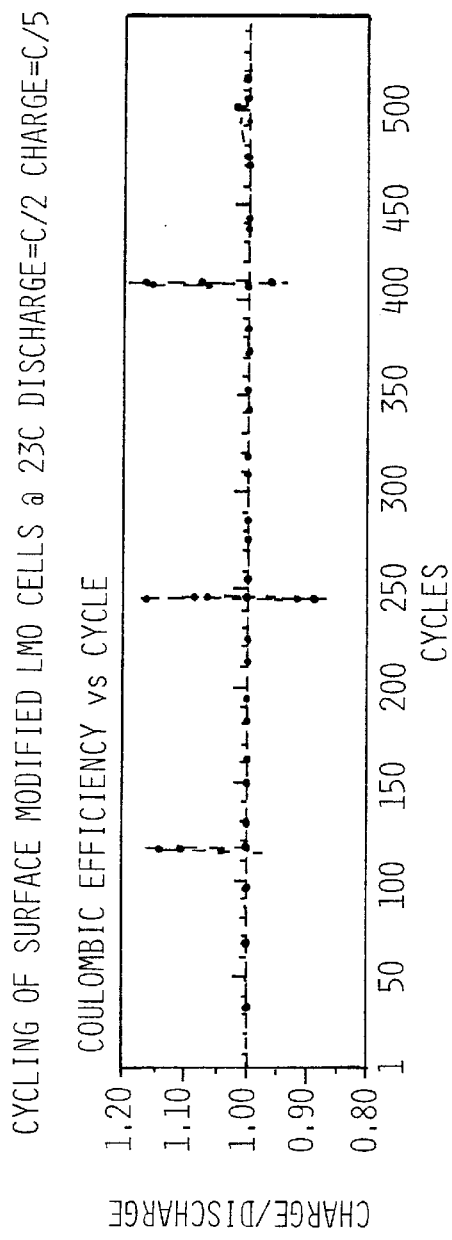
FIG. 6A is Coulombic Efficiency and 6B is Discharge Capacity, each Versus Cycles. The cell charge and discharge are at C/5 and C/2, between 3.0 and 4.2 volts for up to 400 cycles. The cells were cycled at 23° C. with a 2 hour discharge rate C/2 and a 5 hour charge rate C/5, and an additional potentiostatic period at 4.2 volts until current drops to 10% of C/5 rate. The geometrical surface area of the positive electrode was 48 square centimeters.
Figure 6B:
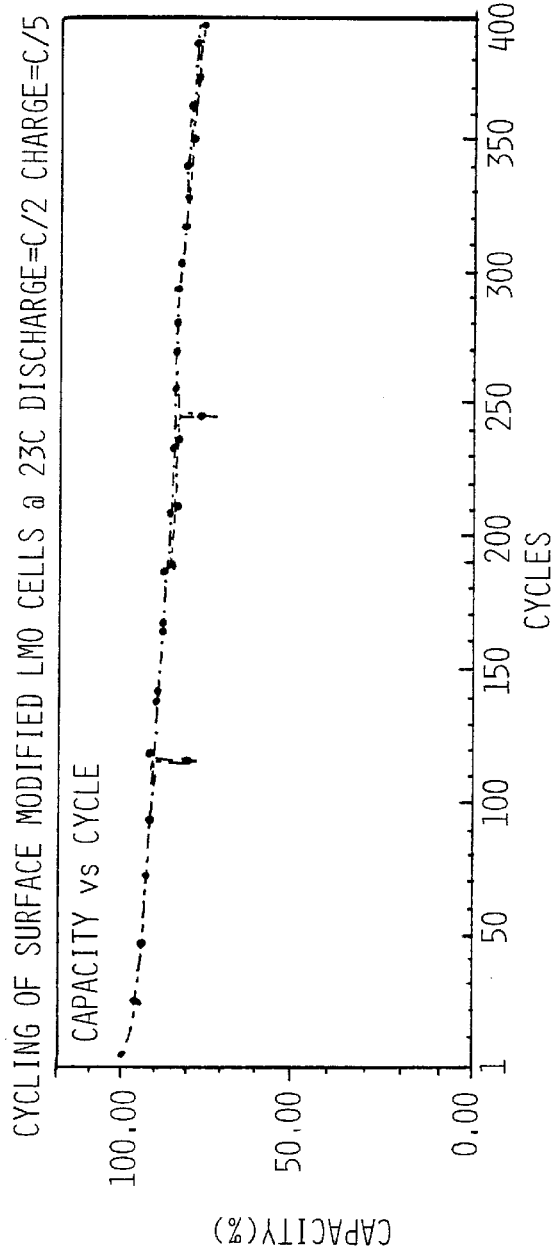
FIG. 6 is a two-part graph showing the results of testing a cell, rocking chair battery, having an anode comprising MCMB active, material cycled with a counter-electrode comprising treated lithium manganese oxide active material as per Examples II and III.

FIG. 6 is a two-part graph. The cell of FIG. 6 contained the LMO heat treated with lithium carbonate. FIG. 6A shows the excellent rechargeability and FIG. 6B shows the excellent cyclability and capacity of the cell prepared in accordance with Examples II and III. The capacity was determined at constant current cycling for up to 400 cycles consistent with the test parameters described above, and at 23° C. versus graphite anode at 2 hour discharge (C/2) and 5 hour charge rate (C/5). FIG. 6 shows long cycle life demonstrated by the relatively slow capacity fade with cycle numbers. The recharge ratio data shows the absence of any appreciable side reactions and decompositions over the extended life cycling. This can be more particularly seen from FIG. 6A. The recharge ratio maintains its value exceptionally close to 1. The cell maintains over 92 percent of its capacity over extended cycling to 100 cycles over 89 percent of its capacity to 200 cycles, and over 75 percent of its capacity at about 400 cycles. The combination of slow, minimal capacity fade along with excellent recharge ratio demonstrates the absence of any appreciable side reactions. It cycled well with low capacity fade. It indicated that the lithium carbonate heated with LMO stabilized the LMO active material. As per all of the Examples, the use of lithium carbonate as an additive stabilizes the LMO cathode active material against breakdown.

For comparison purposes, the additional cells as per Example IV were prepared where the cathode did not contain any lithium carbonate and the cathode LMO was not treated with lithium carbonate. This cell had a lithium metal oxide positive electrode and a MCMB negative counter-electrode. The ratio of the active anode mass to the active cathode mass was 1:3.0. This comparative cell without lithium carbonate was stored at 60° C. for 25 days, along with cells having lithium carbonate additive of the invention as powder additive (Example V) or LMO heat treated with lithium carbonate (Examples II, III).

FIG. 7 contains the results of cycling the comparative cell (without lithium carbonate) and repeats the performance of the cells of the invention for direct comparison. The cells having LMO active material alone, or LMO with particulate lithium carbonate have lesser performance. The cells that did not have LMO heat treated with carbonate had 60–70% loss of capacity after 40–50 cycles. This is evidence that cathode breakdown occurred for the non-heat-treated LMO. The cell with the LMO heat treated lithium carbonate maintained over 70% of its capacity after about 50 cycles. Further evidence of lack of cathode breakdown in this cell is as per FIGS. 8 and 9. In FIG. 9, the cell does not expand in volume and puff up. This shows absence of gas formation caused by breakdown. Absence of such gassing, and absence of irreversible charge consumption demonstrates the unique and important advantages of the invention.

Figure 8:
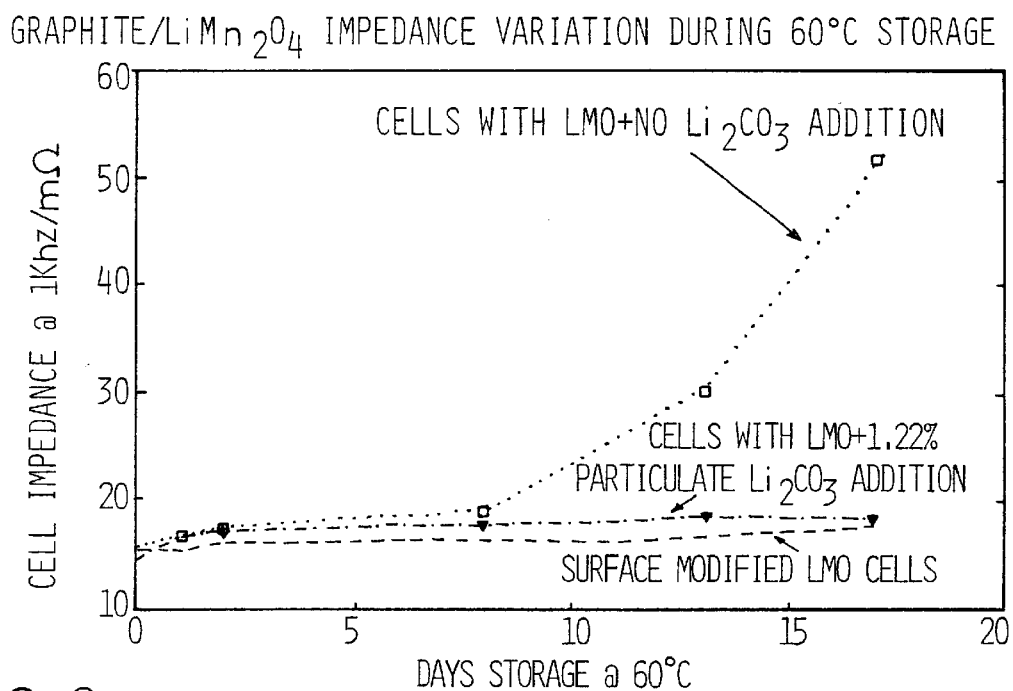
FIG. 8 contains plots of cell impedance variation versus time of storage at 60° C. for the cases (a), (b) and (c) recited for FIG. 7. The cell having surface treated LMO is clearly better than the two comparative: cells.
Figure 9:
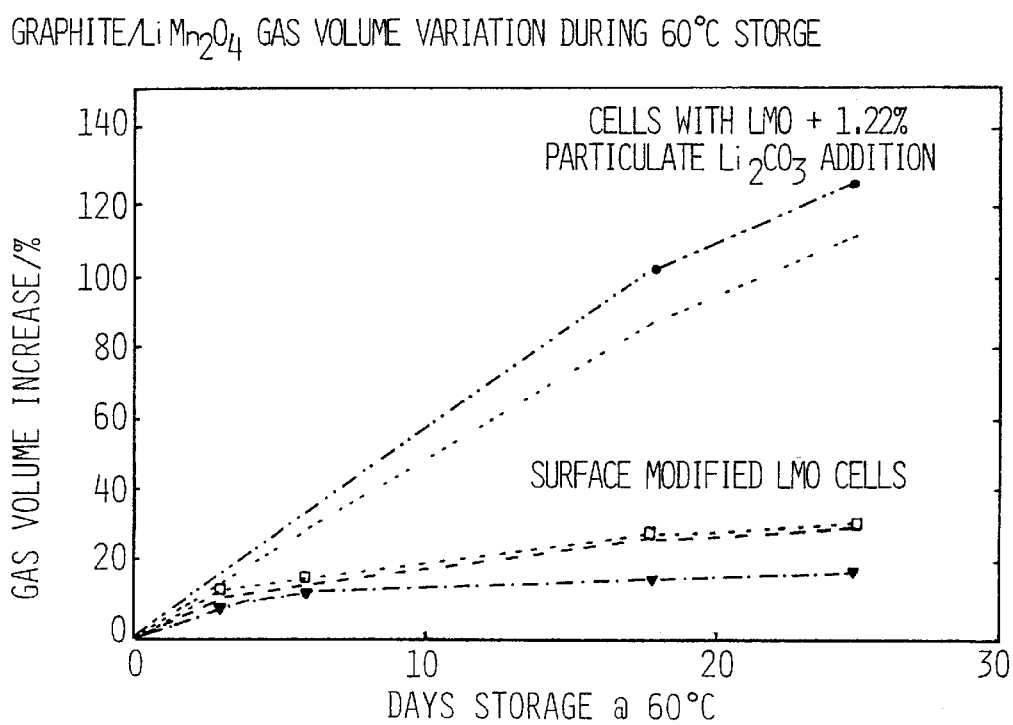
FIG. 9 contains plots of gas volume variation versus time of storage at 60° C. The cell having surface treated LMO (a) is compared to two comparative cells (b) and (c) as recited per FIG. 7. The cell having the treated LMO is clearly better than the two comparative cells.

In FIG. 8, note that the cell having the LMO heat treated with Li$_2$CO$_3$ shows little change in impedance after storage at 60° C. for about 25 days.

Referring back to the original work described in the co-pending applications, the corrosion rate expressed in parts per million (ppm) of Mn$^{+2}$ in the electrolyte is shown in Table IV. Table IV contains data for cells stored at 60° C. for 7 days in an electrolyte comprising 1 molar LiPF$_6$, EC/DMC at 2:1 by weight. Three samples are shown. The first sample is for the lithium manganese oxide spinel as obtained from the vendor and untreated, that is, having no lithium carbonate added or reacted therewith. The second case is LQ1 which has a weight ratio of carbonate to spinel of 1 to 99 and where this mixture was heated at 750° C. for about 0.5 hours. And the last case is KQ1 where the weight ratio of carbonate to spinel was 5% to 95% and again the mixture was heated at 750° C. for 0.5 hours. The electrode of the first case labelled LMO produced 21.8 ppm of Mn$^{+2}$ after 7 days. The electrode containing LMO treated with 1 weight percent lithium carbonate had only about 6 ppm of manganese ion. The best result was obtained for the electrode having 95 weight percent LMO heat treated with 5 weight percent carbonate. It had less than 3 ppm of Mn$^{+2}$ ion in the electrolyte.

It should be noted that the heat treatment method of Example II may be modified. The heat treatment method of Example II recited heat treating the mixture in a first furnace at 600–750° C. for 30 minutes. Then removing the material to a second furnace set at 450° C. for 1 hour and that the second furnace had a good supply of flowing air. The material was then removed from the second furnace and allowed to cool to room temperature. These steps can be replaced by heating the mixture in a single box furnace set at between 650 to 750° C. for 30 minutes. Then the furnace is turned off and the material is allowed to cool in the furnace while insuring there is a good supply of flowing air throughout.

In another alternative, the heating and cooling may be conducted in a Multiple Heat Zone Rotary Furnace.

Here, the material is fed into the hottest part of the furnace, typically at 650–750° C. Then, the material travels through the furnace to another heat zone at a lower temperature, for example, 600° C. Then the material progress to a zone at 400° C. to 450° C., and finally is allowed to cool to room temperature. A good supply of flowing air is provided throughout the furnace.

In summary, the present invention provides an effective means for interfering with the reaction mechanism of acid attack, corrosion of lithium manganese oxide active material. This oxidation degradation is surprisingly not a problem in the case of a comparative lithium cobalt oxide. It is thought that in the case of other lithium oxide materials, such as lithium cobalt oxide, the individual particles of such active material are passivated. The passivation layer is effectively formed around each lithium cobalt oxide particle, therefore, encapsulating each of the particles in a protective film. This prevents degradation of other cell components, and particularly degradation of the electrolyte. In contrast to the relative stability of lithium cobalt oxide active material, the lithium manganese oxide active material is subject to continuing, repetitive corrosive attack which does not permit the development of a stable passivation layer. Therefore, the lithium manganese oxide degradation occurs essentially unabated, and causes break down of other cell components, and particularly the electrolyte. For the first time, the invention has defined the mechanisms of such break down and has identified additives necessary to interfere with such break down and decomposition. In one embodiment, the additive is included in the cell so that it is in direct contact or closely adjacent, in close indirect contact, with individual particles of the lithium manganese oxide. The additive is dispersed within cathode. Such contact can be achieved by an additive which is itself in particle form, and where the particles of the additive are in direct contact or nearly adjacent to the particles of the lithium manganese oxide. Such close, intimate contact between the basic additive and the lithium manganese oxide particles may also be achieved by an additive which is in liquid form and is able to migrate to the lithium manganese oxide particles. Such close interaction is also achieved by an additive which is soluble in the liquid electrolyte solution. Where the basic additive is soluble in the electrolyte, the ionic species of such solubility would be in intimate association, intimate relation with the individual particles of the lithium manganese oxide. Although, oxides, hydroxides, and carbonates, which are preferred for use in the invention, are known to be basic, not all oxides are suitable. For example, silicon oxide is acidic and would not be suitable. Other basic additives among the preferred class are less desirable if they are not electrochemically stable. Carbonates, aluminates, and silicates are particularly desired as they are weak bases. Lithium carbonates, lithium aluminates, and lithium silicates are particularly preferred because they contain a lithium species, and are shown by experimental evidence to be effective in stabilizing the cell.

In another embodiment, the additive is reacted with or decomposed onto the spinel LMO particles. Complete or partial decomposition is possible. Some amount of additive decomposed to achieve Li-enriched LMO is combinable with the inclusion of particulate additive. Other combinations are possible such as partial decomposition which causes Li-enrichment and dispersion of the additive onto the LMO surface. These approaches are demonstrated to be effective as described herein.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

What is claimed is:

1. A method of treating particles consisting of cubic spinel lithium manganese oxide which comprises the steps of (a) forming a mixture consisting of said cubic spinel lithium manganese oxide particles and lithium carbonate; and (b) heating said mixture for a time and at a temperature sufficient to decompose at least a portion of said lithium carbonate, thereby providing treated cubic spinel lithium manganese oxide having increased lithium content as compared to untreated cubic spinel lithium manganese oxide.

2. The method of claim 1 wherein essentially all of said lithium carbonate is decomposed.

3. The method of claim 1 wherein said heating step is conducted in an air atmosphere.

4. The method of claim 1 wherein the heating step is conducted in a flowing air atmosphere.

5. The method of claim 1 wherein heating is conducted at a temperature in a range of about 500° C. to about 800° C.

6. The method of claim 1 wherein the heating is conducted for a time of up to about 10 hours.

7. The method of claim 1 wherein the lithium carbonate is present in the mixture of step (a) in an amount of up to about 5 percent by weight of the total mixture.

8. The method of claim 1 wherein the heating is conducted in stages from a first elevated temperature, then to at least two progressively lower temperatures, and then cooling to an ambient temperature.

9. A method of treating particles of cubic spinel lithium manganese oxide represented by the formula $Li_{1+x}Mn_{2-x}O_4$ with x greater than or equal to zero, which method comprises the steps of (a) forming a mixture comprising said cubic spinel lithium manganese oxide particles and lithium carbonate; and (b) heating said mixture for a time and at a temperature sufficient to decompose at least a portion of said lithium carbonate, thereby providing treated cubic spinel lithium manganese oxide particles having increased lithium content represented by the formula $Li_{1+x}Mn_{2-z}O_4$, where z is greater than x, and z is less than or equal to 0.20.

10. The method of claim 9 wherein the lithium carbonate is in particle form in step (a), and after step (b) at least a portion of said lithium carbonate is adhered to the surface of said treated cubic spinel lithium manganese oxide particles.

11. The method of claim 9 wherein essentially all of said lithium carbonate is decomposed.

12. The method of claim 9 wherein said heating step is conducted in an air atmosphere.

13. The method of claim 9 wherein the heating step is conducted in a flowing air atmosphere.

14. The method of claim 9 wherein heating is conducted at a temperature in a range of about 500° C. to about 800° C.

15. The method of claim 9 wherein the heating is conducted for a time of up to about 10 hours.

16. The method of claim 9 wherein the lithium carbonate is present in the mixture of step (a) in an amount of up to about 5 percent by weight of the total mixture.

17. The method of claim 9 wherein the heating is conducted in stages from a first elevated temperature, then to at least two progressively lower temperatures, and then cooling to an ambient temperature.

* * * * *

UNITED STATES PATENT AND TRADEMARK OFFICE
CERTIFICATE OF CORRECTION

PATENT NO. : 6,183,718 B1
DATED : February 6, 2001
INVENTOR(S) : Barker et al.

It is certified that error appears in the above-identified patent and that said Letters Patent is hereby corrected as shown below:

Column 22, claim 9,
Line 42, "$Li_{1+x}$" should be -- $L_{i+z}$ --.

Signed and Sealed this

Sixth Day of November, 2001

Attest:

NICHOLAS P. GODICI
Attesting Officer
Acting Director of the United States Patent and Trademark Office

UNITED STATES PATENT AND TRADEMARK OFFICE
CERTIFICATE OF CORRECTION

PATENT NO. : 6,183,718 B1
DATED : February 6, 2001
INVENTOR(S) : Barker et al.

It is certified that error appears in the above-identified patent and that said Letters Patent is hereby corrected as shown below:

Title page,
Item [63], "This application is a continuation of U.S. Ser. No. 08/762,081, filed Dec. 9, 1996, now U.S. Patent No. 5,869,207, and a continuation of PCT/US97/22525, filed Nov. 21, 1997." should read -- This application is a continuation in part of PCT/US97/22525, filed Nov. 21, 1997, which is a PCT application of U.S. Ser. No. 08/762,081, filed Dec. 9, 1996, now U.S. Patent No. 5,869,207. --

Signed and Sealed this

Twenty-fourth Day of December, 2002

JAMES E. ROGAN
*Director of the United States Patent and Trademark Office*